(12) United States Patent
Sloop et al.

(10) Patent No.: US 12,021,202 B2
(45) Date of Patent: Jun. 25, 2024

(54) BATTERY DEACTIVATION

(71) Applicant: Hulico LLC, Bend, OR (US)

(72) Inventors: Steven E. Sloop, Bend, OR (US); Lauren E. Crandon, Bend, OR (US)

(73) Assignee: HULICO LLC, Bend, OR (US)

( * ) Notice: Subject to any disclaimer, the term of this patent is extended or adjusted under 35 U.S.C. 154(b) by 130 days.

(21) Appl. No.: 17/095,698

(22) Filed: Nov. 11, 2020

(65) Prior Publication Data

US 2021/0143489 A1 May 13, 2021

Related U.S. Application Data

(60) Provisional application No. 62/934,446, filed on Nov. 12, 2019.

(51) Int. Cl.
| | |
|---|---|
| *H01M 10/42* | (2006.01) |
| *H01M 4/38* | (2006.01) |
| *H01M 10/0525* | (2010.01) |
| *H01M 10/54* | (2006.01) |

(52) U.S. Cl.
CPC ....... *H01M 10/4242* (2013.01); *H01M 4/382* (2013.01); *H01M 10/0525* (2013.01); *H01M 10/4235* (2013.01); *H01M 10/54* (2013.01); *Y02W 30/84* (2015.05)

(58) Field of Classification Search
CPC .. H01M 10/42; H01M 10/4242; H01M 10/54; H01M 6/52; H01M 10/052; H01M 10/0525; H01M 4/382; Y02W 30/84
See application file for complete search history.

(56) References Cited

U.S. PATENT DOCUMENTS

| | | | |
|---|---|---|---|
| 5,352,270 | A | 10/1994 | Shackle |
| 5,628,973 | A | 5/1997 | Nishimura et al. |
| 5,679,477 | A | 10/1997 | Nishimura et al. |
| 5,882,811 | A | 3/1999 | Kawakami |
| 5,888,463 | A | 3/1999 | McLaughlin et al. |
| 6,150,050 | A | 11/2000 | Mathew et al. |

(Continued)

FOREIGN PATENT DOCUMENTS

| | | |
|---|---|---|
| CN | 1413171 A | 4/2003 |
| CN | 1585187 A | 2/2005 |

(Continued)

OTHER PUBLICATIONS

Burford, M. et al., "Extraction and recovery of metals using a supercritical fluid with chelating agents," The Analyst, vol. 124, Feb. 4, 1999, 6 pages.

(Continued)

*Primary Examiner* — Jeremiah R Smith
(74) *Attorney, Agent, or Firm* — Alleman Hall & Tuttle LLP

(57) ABSTRACT

Examples are disclosed of methods to deactivate a lithium-containing battery. One example provides a method for discharging a lithium-containing battery, the method comprising adding the lithium-containing battery to a vessel, adding an oxidizing fluid to the vessel, adding carbon dioxide to the vessel, pressurizing the vessel, heating the vessel to form lithium carbonate within the lithium-containing battery, reducing heat and pressure in the vessel, and removing the battery from the vessel.

15 Claims, 8 Drawing Sheets

(56) References Cited

U.S. PATENT DOCUMENTS

| | | | |
|---|---|---|---|
| 6,261,712 | B1 | 7/2001 | Hayashi et al. |
| 6,273,921 | B1 | 8/2001 | Stanford et al. |
| 6,284,412 | B1 | 9/2001 | Minakata et al. |
| 6,306,542 | B1 | 10/2001 | Nakano et al. |
| 6,511,639 | B1 | 1/2003 | Schmidt et al. |
| 6,524,737 | B1 | 2/2003 | Tanii et al. |
| 6,652,644 | B1 | 11/2003 | Miller et al. |
| 6,706,443 | B1 | 3/2004 | Krampitz et al. |
| 6,844,103 | B2 | 1/2005 | Lee et al. |
| 7,713,396 | B2 | 5/2010 | Kakuta et al. |
| 8,497,030 | B2 | 7/2013 | Sloop |
| 8,882,007 | B1 | 11/2014 | Smith et al. |
| 9,484,606 | B1 | 11/2016 | Sloop et al. |
| 9,614,261 | B2 | 4/2017 | Kepler et al. |
| 2001/0008723 | A1 | 7/2001 | Kawakami et al. |
| 2002/0124691 | A1 | 9/2002 | Tateiwa et al. |
| 2003/0180604 | A1 | 9/2003 | Zenger et al. |
| 2003/0186110 | A1 | 10/2003 | Sloop |
| 2004/0028585 | A1 | 2/2004 | Cardarelli et al. |
| 2004/0175618 | A1 | 9/2004 | Inoue et al. |
| 2005/0003276 | A1 | 1/2005 | Sakai et al. |
| 2005/0175877 | A1 | 8/2005 | Hong |
| 2005/0244704 | A1 | 11/2005 | Sloop et al. |
| 2007/0054187 | A1 | 3/2007 | Nuspl et al. |
| 2007/0134546 | A1 | 6/2007 | Hashimoto |
| 2007/0224508 | A1 | 9/2007 | Aramata et al. |
| 2009/0214933 | A1 | 8/2009 | Sloop |
| 2009/0272650 | A1 | 11/2009 | Kakuta et al. |
| 2009/0286137 | A1 | 11/2009 | Sloop |
| 2010/0146761 | A1 | 6/2010 | Sloop |
| 2010/0203366 | A1 | 8/2010 | Sloop |
| 2013/0287621 | A1* | 10/2013 | Fujita ............... C22C 19/07 75/401 |
| 2014/0377597 | A1 | 12/2014 | Sloop |
| 2016/0043450 | A1 | 2/2016 | Sloop |
| 2017/0200989 | A1 | 7/2017 | Sloop |
| 2018/0026318 | A1 | 1/2018 | Shin et al. |

FOREIGN PATENT DOCUMENTS

| | | | |
|---|---|---|---|
| CN | 102017277 A | | 4/2011 |
| CN | 103151519 A | | 6/2013 |
| CN | 105098281 A | | 11/2015 |
| CN | 106910959 A | * | 6/2017 ............. C22B 26/12 |
| CN | 107910610 A | * | 4/2018 ........ H01M 10/0525 |
| EP | 1009058 A1 | | 6/2000 |
| JP | H09320588 A | | 12/1997 |
| JP | H10255862 A | | 9/1998 |
| JP | 11054159 A | | 2/1999 |
| JP | 2003206132 A | * | 7/2003 |
| WO | 2008074352 A1 | | 6/2008 |
| WO | WO-2015046218 A1 | * | 4/2015 .......... H01M 10/052 |
| WO | 2015077080 A1 | | 5/2015 |
| WO | 2015128219 A1 | | 9/2015 |

OTHER PUBLICATIONS

Ely, Y. et al., "Identification of Surface Films Formed on Active Metals and Nonactive Metal Electrodes at Low Potentials in Methyl Formate Solutions," Langmuir, vol. 8, No. 7, Jul. 1, 1992, 6 pages.

Erkey, C., "Supercritical carbon dioxide extraction of metals from aqueous solutions: a review," Journal of Supercritical Fluids, vol. 17, No. 3, Jun. 10, 2000, 29 pages.

Gan, H. et al., "Lithium electrodes with and without CO2 treatment: electrochemical behavior and effect on high rate lithium battery performance," Journal of Power Sources, vol. 62, No. 1, Sep. 1996, 6 pages.

Kim, D. et al., "Simultaneous separation and renovation of lithium cobalt oxide from the cathode of spent lithium ion rechargeable batteries," Journal of Power Sources, vol. 132, May 20, 2004, 5 pages.

O'Neil, A. et al., "Green chemistry in the microelectronics industry," Green Chemistry, vol. 6, Aug. 6, 2004, 6 pages.

Sakaebe, H. et al., "Discharge-charge properties of Li/LiCoO2 cell using room temperature ionic liquids (RTILs) based on quaternary ammonium cation—Effects of the structure," Journal of Power Sources, vol. 146, Apr. 27, 2005, 5 pages.

Xu, J. et al., "A review of processes and technologies for the recycling of lithium-ion secondary batteries," Journal of Power Sources, vol. 177, Jan. 14, 2008, 16 pages.

Gabrisch, H. et al., "Hexagonal to Cubic Spinel Transformation in Lithiated Cobalt Oxide," Journal of the Electrochemical Society, vol. 151, No. 6, May 4, 2004, 7 pages.

Antolini, E., "LiCoO2: formation, structure, lithium and oxygen nonstoichiometry, electrochemical behaviour and transport properties, " Solid State Ionics, vol. 170, No. 3-4, May 2004, 13 pages.

European Patent Office, Extended European Search Report Issued in Application No. 09713108.0, Mar. 4, 2013, Germany, 11 pages.

ISA United States Patent and Trademark Office, International Search Report and Written Opinion Issued in Application No. PCT/US2009/034779, Apr. 16, 2009, WIPO, 10 pages.

Ra, D. et al., "Used lithium ion rechargeable battery recycling using Etoile-Rebatt technology," Journal of Power Sources, vol. 163, Jul. 24, 2006, 5 pages.

Han, K. et al., "Fabrication in a Single Synthetic Step of Electrochemically Active LiMO2 (M= Ni and Co) Thin-Film Electrodes Using Soft Solution Processing at 20-200° C," Chemistry of Materials, vol. 10, No. 8, Jul. 25, 1998, 6 pages.

Han, K. et al., "Room-Temperature Fabrication of Lithium Cobalt Oxide Thin-Film Electrodes by Lithium Hydroxide Solution Treatment," Journal of the American Ceramic Society, vol. 81, No. 9, Sep. 1998, 4 pages.

Han, K. et al., "Soft solution processing for fabrication of lithiated thin-film electrodes in a single synthetic step," Journal of Material Chemistry, vol. 8, No. 9, Aug. 1998, 6 pages.

Kosova, N.V. et al., "Mixed layered Ni—Mn—Co hydroxides: Crystal structure, electronic state of ions, and thermal decomposition," Journal of Power Sources, vol. 174, No. 2, Jun. 27, 2007, 6 pages.

Li, J. et al., "Synthesis and characterization of LiNi0.6Mn0.4-xCoxO2 as cathode materials for Li-ion batteries," Journal of Power Sources, vol. 189, No. 1, Apr. 1, 2009, 6 pages.

Manthiram, A. et al., "Low Temperature Synthesis of Insertion Oxides for Lithium Batteries," Chemistry of Materials, vol. 10, No. 10, Sep. 18, 1998, 15 pages.

Shaju, K.M. et al., "Performance of layered Li(Ni1/3Co1/3Mn1/3)O2 as cathode for Li-ion batteries" Electrochimica Acta, vol. 48, No. 2, Nov. 2002, 7 pages.

Shin, Y. et al., "Continuous hydrothermal synthesis of HT-LiCoO2 in supercritical water," The Journal of Supercritical Fluids, vol. 50, No. 3, Oct. 2009, 7 pages.

Watanabe, T. et al., "Direct fabrication of crystalline vanadates films by hydrothermal-electrochemical method," Solid State Sciences, vol. 3, No. 1, Feb. 2001, 6 pages.

European Patent Office, Extended European Search Report Issued in Application No. 15829934.7, May 29, 2017, Germany, 7 pages.

Dokko, K. et al., "Identification of Surface Impurities on LiFePO4 Particles Prepared by a Hydrothermal Process," Journal of the Electrochemical Society, vol. 152, No. 11, Sep. 30, 2005, 4 pages.

Ganter, M. et al., "Cathode refunctionalization as a lithium ion battery recycling alternative," Journal of Power Sources, vol. 256, Jan. 24, 2014, 7 pages.

Gratz, E. et al., "A closed loop process for recycling spent lithium ion batteries," Journal of Power Sources, vol. 262, Apr. 2, 2014, 8 pages.

ISA Korean Intellectual Property Office, International Search Report and Written Opinion Issued in Application No. PCT/US2015/044103, Sep. 30, 2015, WIPO, 13 pages.

ISA Korean Intellectual Property Office, International Search Report and Written Opinion Issued in Application No. PCT/US2017/012776, Sep. 29, 2017, WIPO, 16 pages.

Jiang, C.H. et al., "Synthesis of spinel LiMn2O4 nanoparticles through one-step hydrothermal reaction," Journal of Power Sources, vol. 172, No. 1, Jul. 27, 2007, 6 pages.

(56) References Cited

OTHER PUBLICATIONS

ISA United States Patent Office, International Search Report and Written Opinion Issued in Application No. PCT/US2020/32877, Aug. 12, 2020, 8 pages.
China National Intellectual Property Administration, Office Action and Search Report Issued in Application No. 201780015557.4, Nov. 25, 2020, 32 pages.
ISR United States Patent and Trademark Office, International Search Report and Written Opinion Issued in Application No. PCT/US2020/060060, Mar. 12, 2021, WIPO, 11 pages.

* cited by examiner

BATTERY DEACTIVATION

CROSS REFERENCE TO RELATED APPLICATION

The present application claims priority to U.S. provisional application No. 62/934,446 entitled BATTERY DEACTIVATION filed Nov. 12, 2019, the entire contents of which are hereby incorporated by reference in its entirety for all purposes.

STATEMENT REGARDING FEDERALLY SPONSORED RESEARCH AND DEVELOPMENT

This invention was made with government support under contract no. EE0008475 awarded by the U.S. Department of Energy. The government has certain rights in the invention.

TECHNICAL FIELD

The present application relates to the field of lithium-ion batteries, and more particularly, to deactivating a lithium-ion battery.

BACKGROUND

Lithium-ion batteries provide power to products ranging from automobiles to smart phones. These batteries are rechargeable over many cycles, tolerant to various environmental factors, and have a relatively long useful lifetime. Nevertheless, they eventually fail or are discarded prior to failure, and therefore contribute to a significant and growing waste stream. In view of this situation, environmental regulations, industry standards, and collection services have arisen to promote the recycling of lithium-ion batteries.

SUMMARY

Examples are disclosed that relate to deactivating lithium-containing batteries. One example provides a method for deactivating a lithium-containing battery, the method comprising adding the lithium-containing battery to a vessel, adding an oxidizing fluid to the vessel, adding carbon dioxide to the vessel, pressurizing the vessel, heating the vessel to form lithium carbonate within the lithium-containing battery, reducing heat and pressure in the vessel, and removing the battery from the vessel.

DETAILED DESCRIPTION

Figure 1A:
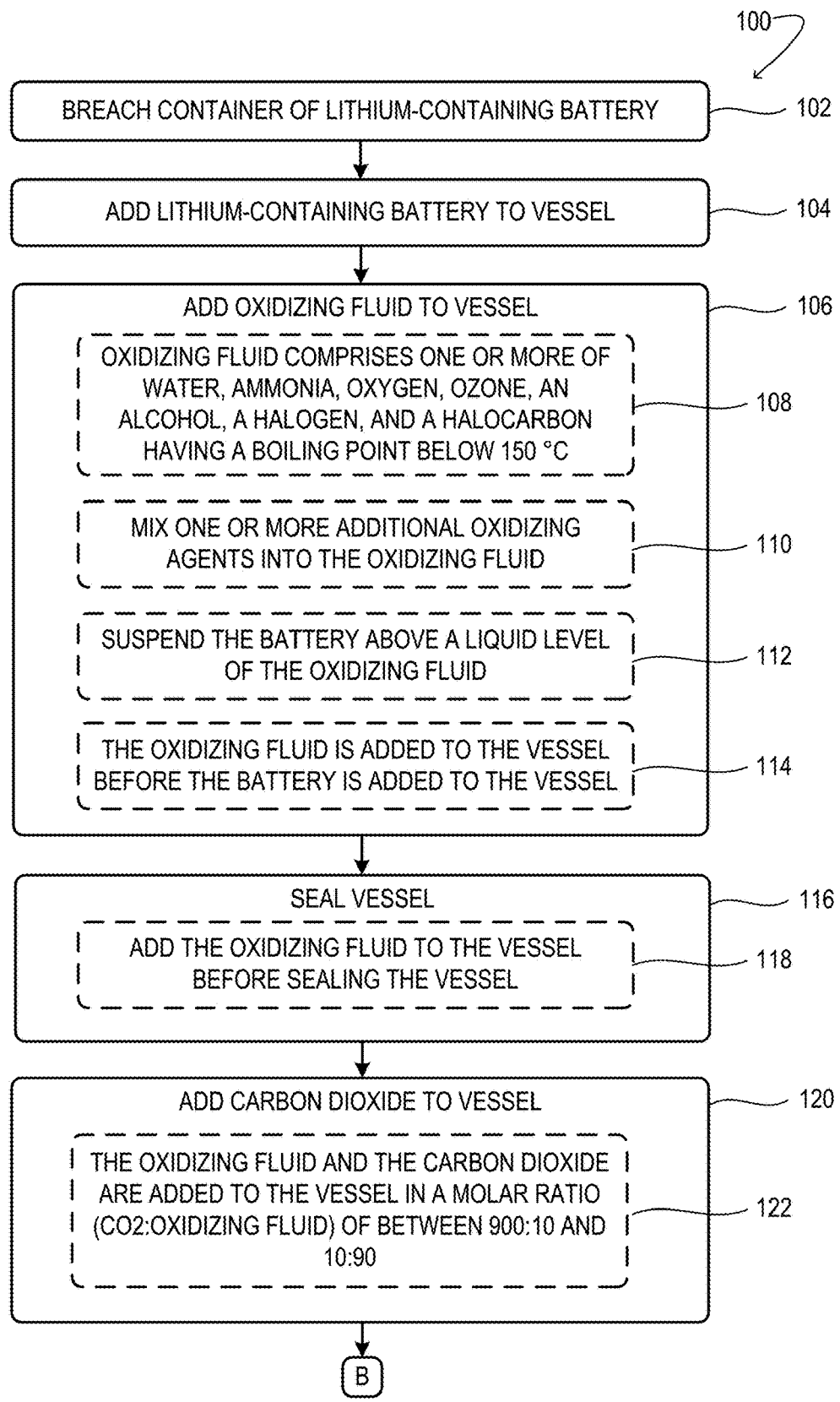
FIGS. 1A and 1B illustrate an example method to deactivate a lithium-containing battery in accordance with an embodiment of this disclosure.

Recycling of lithium-ion batteries may be challenging and pose various dangers. One such danger that may be encountered is the problem of thermal runaway, characterized by uncontrolled rapid heating of the battery created by positive feedback between battery cell temperature and conductivity of the electrolyte in the battery. Overheating due to thermal runaway may cause melting of stranded lithium in the battery, leading to or accelerating vigorous chemical reactions and the potential to start fires. Even in spent lithium-ion batteries, there may be some amount of stranded lithium remaining, subject to thermal runaway. Further, treatment processes, such as those using saltwater to discharge the battery or supercritical carbon dioxide alone to extract electrolytes from the battery, may not sufficiently discharge or passivate all of the lithium remaining in the battery. As batteries in recycling facilities or in transit may be exposed to high temperatures (e.g. environmental or due to recycling processes), such conditions may trigger thermal runaway in waste-stream lithium-ion batteries upon reaching a threshold temperature. Thus, there is a need to prevent thermal runaway in spent lithium-ion batteries to help ensure safe recycling and/or disposal thereof, and reduce costs involved in shipping and recycling spent lithium-ion batteries.

In addition, electrical discharge does not address other risks associated with a state of health of waste-stream lithium-ion batteries, such as an electrolyte material, gas content, electrolyte aging, lithium dendrite, delaminated carbon lithium, container corrosion, and blown fuses. Such risks may be exacerbated when handling large numbers of battery cells.

Accordingly, examples are disclosed that relate to passivating stranded lithium in a waste-stream lithium-ion battery, thereby deactivating the battery and helping to prevent thermal runaway. Deactivation is used herein to signify removal of stored energy, as opposed to discharging the battery, which involves oxidation at the anode and reduction at the cathode. Briefly, the disclosed methods include deactivating a battery by adding an oxidizing agent (e.g. an oxidizing fluid) and carbon dioxide to a vessel containing a lithium-containing battery, and pressurizing and heating the vessel to form lithium carbonate within the lithium-containing battery. In some examples, pressurizing the vessel comprises forming a condensed carbon dioxide phase. The condensed carbon dioxide may help to passivate any remaining lithium ions, lithium metal, and lithium alloys in the battery, while the oxidizing fluid may help the condensed carbon dioxide to reach the lithium through a solid electrolyte interphase (SEI) and/or a passivated layer of lithium carbonate surrounding stranded active lithium in the battery. During battery operation, the SEI allows Li+ transport while blocking electrons to prevent electrolyte decomposition. In the disclosed deactivation processes, without wishing to be bound by theory, the oxidizing fluid may react with lithium to form lithium hydroxide. For example, in the case of water being used as the oxidizing fluid, 2 Li(s)+2 H$_2$O->2 LiOH (aq)+H$_2$(g). While this is a vigorous exothermic reaction that produces flammable hydrogen gas, the carbon dioxide may help to mitigate the potentially violent nature of the reaction of water and lithium. Further, the hydrogen gas evolution may play a role in disruption of the passivating character of the SEI, allowing carbon dioxide to reach any remaining lithium in the battery to form lithium carbonate. The disclosed examples may be used with any suitable type of lithium ion battery, including batteries with liquid electrolytes, solid electrolytes (e.g. polymer electrolytes), composite electrolytes, and batteries using metallic lithium or lithium alloy electrodes. Some examples of batteries that have been successfully passivated include batteries having initial measurements of 0-3.2V (for a lithium iron phosphate system) and residual lithium of 0-30 µmol/cm$^2$ in the anode; and 0-4.2 V (for a NMC system) and a residual lithium of 0-5.3 µmol/cm$^2$ in the anode. An example of a treatment that results in relatively low residual lithium is as follows: place the battery into a 4 L autoclave, with 400 mL of 3% hydrogen peroxide, (the battery is located above the fluid), seal the vessel and introduce CO$_2$ to 900 psi at room temperature and let the system dwell for 30 min. Heat the vessel to 120° C. while maintaining the pressure below 900 psi (for example, between 500-900 psi), and let the system dwell for 30 min at temperature. Next, cool to 40° C. in about 30 min (e.g. using a cooling coil), depressurize the vessel, open the vessel, and remove the battery.

Figure 1B:
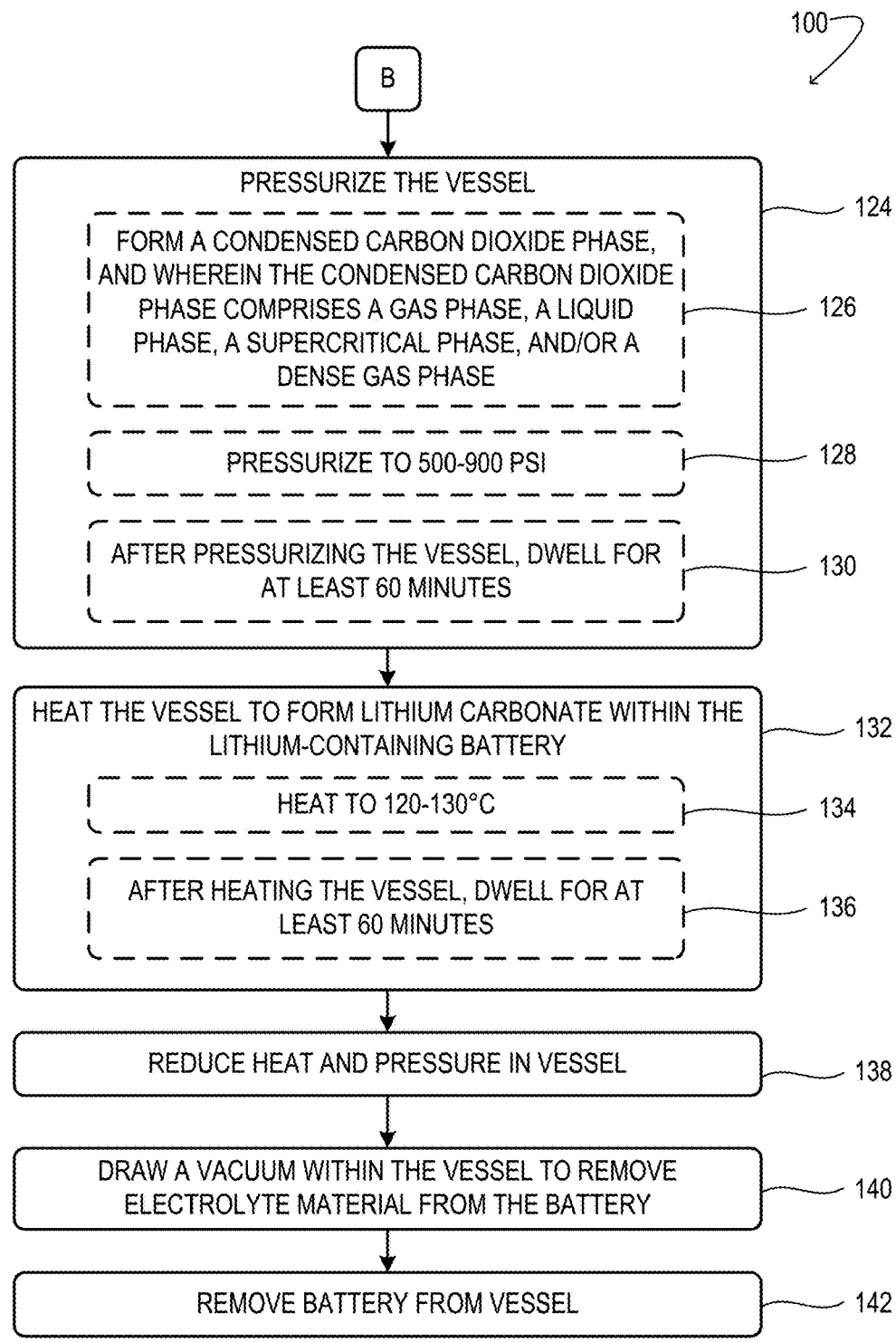

FIGS. 1A and 1B show an example method 100 of deactivating a lithium-containing battery. It will be understood that various steps of method 100 may be omitted or performed in a different order than described, and that additional steps also may be included.

With reference to FIG. 1A, in some examples, the method 100 includes, at 102, breaching a container of the lithium-containing battery to expose the chemicals inside the battery. The battery container may be breached in any suitable manner, including by machining the container open with a laser beam, water jet, shredder, by pressure in the reactor, etc. For example, it may be difficult for carbon dioxide and oxidizing fluid to penetrate some types of batteries (e.g. some types of pouch cells and large automotive cells). In some examples, breaching the battery container may further include disassembling the battery. For example, some lithium nickel cobalt manganese (NCM), lithium nickel cobalt aluminum oxide (NCA) batteries, and jelly-roll-type batteries have thick layers and/or densely spaced layers of material. Accordingly, such types of batteries may be opened, disassembled, and/or unrolled to facilitate deactivation.

Method 100 includes, at 104, adding the lithium-containing battery to a vessel. It will be understood that in some examples, the battery may be breached within the vessel. For example, some types of batteries (e.g. many prismatic and cylindrical batteries) may not need to be breached before being added to the vessel. In some examples, when a battery is not deliberately breached at 102 before being added to the vessel, the battery may be breached by elevated pressure (or vacuum exposure) within the vessel during deactivation. Advantageously, in some examples, an entire battery pack comprising multiple cells may be treated and deactivated prior to being disassembled. This may be especially useful in examples where it is not economically viable to disassemble and repackage cells of the battery pack, and in examples where it may be hazardous to handle the battery pack, such as when treating a battery recovered from an electric vehicle that was involved in a crash.

Method 100 further includes, at 106, adding an oxidizing fluid to the vessel. In some examples, at 108, the oxidizing fluid comprises one or more of water, ammonia, oxygen, ozone, SO$_2$, an alcohol, a halogen (e.g. Cl$_2$), and a halocarbon having a boiling point below 150° C. In some examples, the oxidizing fluid may be any suitable liquid or gas that is able to donate protons and/or accept electrons. As one example, water is an oxidizing fluid that is relatively simple and easily available. Other examples of oxidizing fluids include other solvents, such as alcohols (e.g. methanol, ethanol) and halocarbons (e.g. fluorocarbon solvents and/or other halide solvents such as chloroform or CCl$_4$). In some examples, an alcohol or halide solvent used as an oxidizing fluid may have a boiling point of below 150° C.

In other examples, the oxidizing fluid may be a suitable liquid or gas that does not donate protons. As one example, the oxidizing fluid may be ozone gas. In some examples, proton donors can react with a battery electrolyte to produce toxic substances, such as hydrogen fluoride. Accordingly, aprotic oxidizing fluids may mitigate production of such toxic substances. In yet other examples, a base such as Li$_2$CO$_3$ may be mixed in combination with the oxidizing fluid to neutralize the electrolyte.

One or more additional oxidizing agents may be further mixed in combination with the oxidizing fluid, as shown at 110. Examples include a salt (e.g. sodium hypochlorite, lithium hypochlorite, sodium sulfite, lithium sulfite, sodium/lithium/ammonium thiosulfate), a peroxide (e.g. hydrogen peroxide, lithium peroxide), ozone, oxygen, or any other suitable oxidizers that are miscible with water, or otherwise may combine with water (i.e. an emulsion, solution, etc.) and/or other selected oxidizing fluid. With the use of chlorine containing material, the end product with an active lithium source may include lithium chloride; with the use of sulfur containing material, the end product with lithium may include sulfates or sulfides of lithium. Such deactivated lithium products may be single phase material or mixtures with lithium carbonate, lithium oxide, and/or lithium hydroxide.

In some examples, as shown at 112, the battery is suspended above a liquid level of the oxidizing fluid. For example, the battery may rest on an inert object above a bottom of the vessel (e.g. a shelf inside an autoclave). In this manner, the battery may be exposed to oxidizing vapors without becoming waterlogged. In addition, more of the battery may be exposed to the carbon dioxide, which may not be miscible in the oxidizing fluid.

In other examples, the battery may rest on an active object within the vessel, such as positive thermal coefficient (PTC) discharge beads. PTC beads may form a circuit with the battery and heat up as current flows through the circuit. The PTC beads provide increased resistance with increased temperature, thereby allowing a reaction system to self-regulate battery discharge.

In other examples, the oxidizing fluid may be added to at least partially or fully cover the lithium-containing battery with the oxidizing fluid within the vessel. Fully submerging the battery in the oxidizing fluid may help to ensure that the battery becomes fully passivated. Further, in some examples, the battery may be exposed to a flow of the oxidizing fluid, e.g. in a continuous flow process.

As shown at 114, the oxidizing fluid may be added to the vessel before the battery is added to the vessel. It will also be appreciated that the oxidizing fluid may be added to the vessel after the battery is added.

Method 100 further includes, at 116, sealing the vessel. In some examples, as shown at 118, the oxidizing fluid is added before sealing the vessel. In other examples, the oxidizing fluid may be added after sealing the vessel. For example, the battery may be sealed inside a dry vessel, and the oxidizing fluid may be piped into the sealed vessel.

At 120, the method 100 includes adding carbon dioxide to the vessel. Any suitable ratio of carbon dioxide to oxidizing fluid(s) may be utilized. For example, as indicated at 122, carbon dioxide and oxidizing fluid(s) may be added in a molar ratio ($CO_2$:oxidizing fluid) of between 99:1 and 10:90. In other examples, the molar ratio may be between 98:2 and 10:90. As one illustrative example, the reactor vessel may be filled with 10% water by volume or a dilute solution of hydrogen peroxide. At 100° C., the vapor pressure of the water in the headspace of the vessel is 1 atm or approximately 14 psi. The rest of the reactor is filled with carbon dioxide by piping liquid carbon dioxide into the room-temperature reactor. As described in more detail below, the vessel may be pressurized to up to 900 psi by the addition of carbon dioxide, such that 90% of the rector is filled with condensed phase carbon dioxide.

In some examples, the carbon dioxide is added separately from the oxidizing fluid, in either a temporally overlapping or temporally non-overlapping manner. In other examples, the carbon dioxide is added mixed with the oxidizing fluid. The mixing can be performed in storage or prior to injection, or may occur during injection. Further, the injection of oxidizing fluid and carbon dioxide can be made via a same nozzle or by different nozzles in various examples.

With reference now to FIG. 1B, as indicated at 124, the vessel is pressurized. At 126, pressurizing the vessel may comprise forming a condensed carbon dioxide phase. The condensed carbon dioxide phase may take the form of liquid carbon dioxide, or dense carbon dioxide gas in various examples. For example, as indicated at 128, the vessel may be pressurized to 500-900 psi. The use of liquid or condensed gas-phase carbon dioxide may offer advantages over using supercritical carbon dioxide. For example, capital equipment costs for equipment to work with condensed gas-phase or liquid phase carbon dioxide may be lower than for equipment for handling supercritical carbon dioxide. Further, the use of liquid or condensed gas-phase carbon dioxide may allow the use of a higher fraction of water or other reactant in the vessel and thus admixed into the carbon dioxide (homogeneously or heterogeneously). However, in some examples, supercritical carbon dioxide may be used.

In some examples, at 130, the method 100 includes, after pressurizing the vessel with liquid $CO_2$, dwelling for at least 60 minutes. This dwelling process may be performed at any suitable temperature. In some examples, the dwelling may be performed at a temperature between −55 degrees Celsius (e.g. by the addition of cryogenic carbon dioxide) and room temperature (e.g. 25 degrees Celsius). The use of cooled carbon dioxide may help to prevent thermal runaway of a battery during processing. During this time, the battery may be at least partially deactivated, and some of the electrolyte dissolved. For example, 10-20% of the electrolyte may be dissolved during 60 minutes of dwelling at ambient temperature. In other examples, the initial dwelling may be performed at a higher temperature, or may be omitted. In yet other examples, the dwelling may be performed in carbon dioxide without the oxidizing fluid, and the oxidizing fluid can be added after the dwelling process.

At 132, the method 100 includes heating the vessel to form lithium carbonate within the lithium-containing battery. As described above, the condensed carbon dioxide phase may help to passivate any remaining lithium (e.g. stranded lithium) in the battery by forming a passivating layer of lithium carbonate encapsulating the remaining lithium. An example pathway for the formation of lithium carbonate is $2Li+CO_2 \rightarrow Li_2O+CO$, followed by $Li_2O+CO_2 \rightarrow Li_2CO_3$, while the oxidizing fluid may help the carbon dioxide to reach the lithium through the SEI. Example anode materials that may contain stranded lithium and/or other unreacted lithium include graphite-Li, silicon-Li, lithium metal, and various lithium alloys including tin, aluminum, etc. The passivating layer may be formed by $CO_2$ alone, but the addition of water, peroxide, $SO_2$, or another suitable oxidizing fluid may help with the formation of a passivating layer, for example by increasing a rate of formation and/or a resulting thickness of the passivating layer. The thickness of the passivating layer is estimated to be 1,300-20,000 Angstroms, as measured via impedance spectroscopy for example.

In some examples, as indicated at 134, the vessel may be heated to a temperature within the range of 120-130° C. In other examples, the vessel may be set to and maintained at a temperature of up to 50° C.-200° C. The vessel may be heated for any suitable amount of time, in order to allow reactions to take place to substantially fully passivate any lithium in the battery, such that the risk of thermal runaway is mitigated. As an example, the vessel may be heated for between 45 minutes to 2 hours.

Further, and as indicated at 136, the contents of the vessel may dwell for at least 30-60 minutes after the vessel is heated. In some examples, method 100 may include dwelling at a first temperature within the temperature range, and then ramping up to a second, higher temperature. For example, larger batteries (e.g. a 26 Ah cell) may dwell at ambient temperature for 20 min-12 hrs. The vessel may dwell at the first temperature for a longer amount of time and at the second, higher temperature for a shorter amount of time, or vice versa. For example, a 26 Ah cell might soak for 0-12 hours at a lower temperature, and 0-12 hr at a higher temperature (e.g. 120° C.). For a typical treatment, the battery is soaked for 20 min at ambient temperature and 30 min higher temperature. A longer low temperature soak (e.g. cryogenic) may be appropriate for a battery that is classified as damaged, defective, or with signs of damage and risk of thermal runaway (e.g. puffy cells, heat generation, or abused systems).

It will be appreciated that the vessel may be heated in any suitable manner. For example, the vessel may comprise a jacketed heating system. In other examples, the reactor may be heated by piping in steam and/or hot $CO_2$. Further, the vessel may be vented during and/or after heating to maintain a desirable pressure (e.g. in the range of 500-900 psi).

Method 100 further includes, at 138, reducing the heat and pressure in the vessel. In some examples, at 140, the method 100 includes drawing a vacuum within the vessel to remove electrolyte material (and any fluid) from the battery (and autoclave). As indicated in FIG. 1B, the electrolyte may be extracted after passivating the battery, and before removing the battery from the vessel. The vacuum may be maintained for any suitable amount of time to extract at least a substantial portion of the electrolyte within the battery, such as 2 hours. At 142, the battery may be removed from the vessel. It will also be appreciated that one or more steps of the method 100 may be repeated, either before or after removing the battery from the vessel. In this manner, the battery may undergo multiple cycles of deactivation and/or electrolyte removal.

Figure 2:
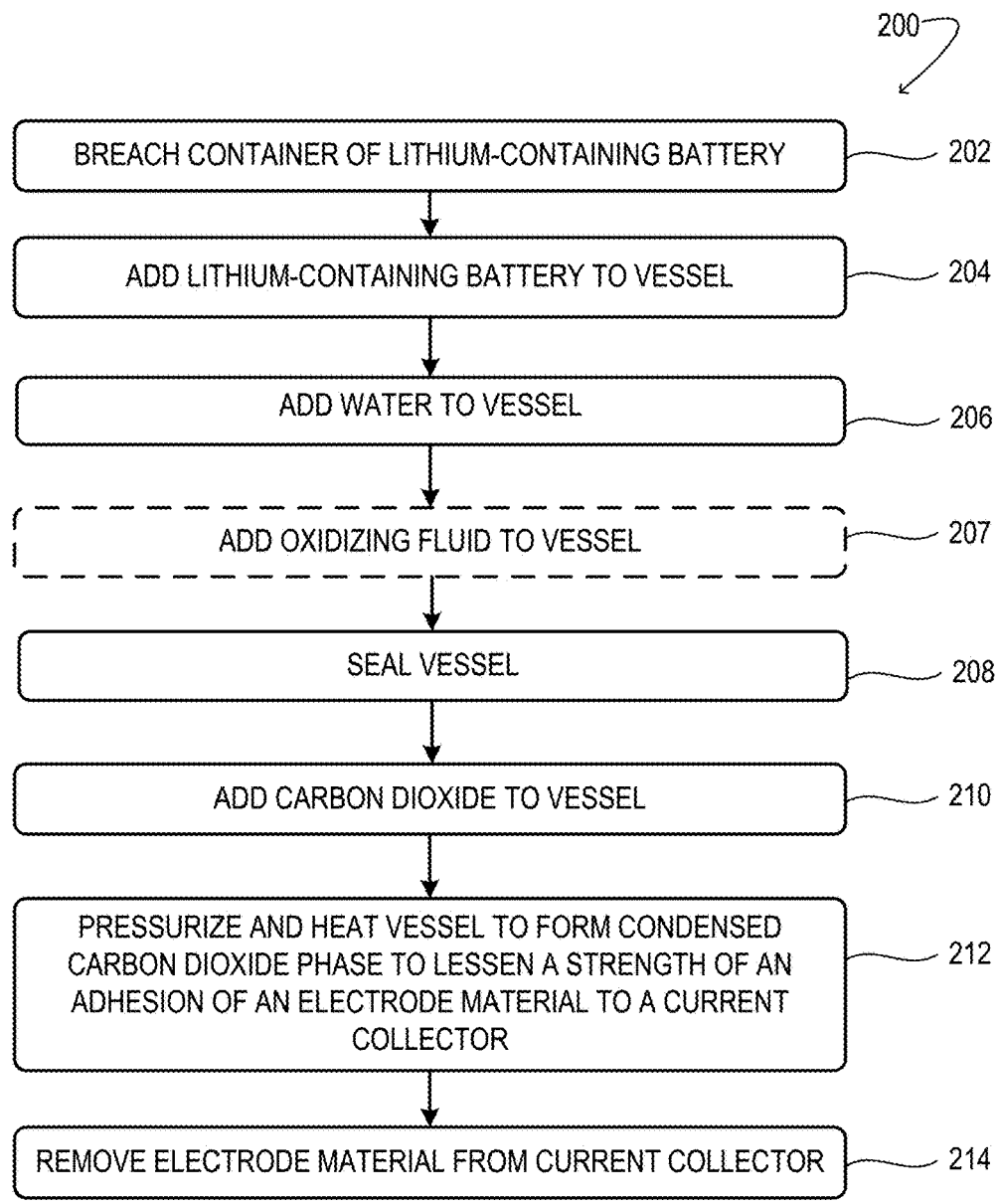
FIG. 2 illustrates another example method to deactivate a lithium-containing battery in accordance with an embodiment of this disclosure.

Further, in some examples, the methods disclosed herein may help to delaminate electrode materials from the current collectors of a battery. FIG. 2 shows an example method 200 of deactivating a lithium-containing battery that may help to delaminate electrode material from a current collector. Method 200 includes, at 202, breaching the container of the lithium-containing battery, and at 204, adding the battery to a vessel. At 206, method 200 includes adding water to the vessel. In some examples an additional oxidizing fluid may be added to the vessel, at 207. As described above, the oxidizing fluid may comprise an alcohol (e.g. methanol, ethanol), a halocarbon (e.g. fluorocarbons), halogenated solvents, as well as combinations of such fluids. Additional oxidizing agents may be mixed in combination with the oxidizing fluid, such as an oxidizing salt (e.g. salts with polyatomic oxidizing anions, such as manganese oxide anions and chlorine oxide anions), a peroxide, a halogen (e.g. chlorine, bromine or iodine), ozone, and/or any other suitable oxidizers that are miscible with water. Method 200 further includes, at 208, sealing the vessel, and at 210, adding carbon dioxide to the vessel. Method 200 further includes, at 212, pressurizing and heating the vessel to form a condensed carbon dioxide phase. It has been observed by the inventor that the addition of a peroxide (e.g. hydrogen peroxide) may help to delaminate the electrode materials from the current collectors of a battery, e.g. by lessening a strength of an adhesion of the electrode materials to the current collector. As such, in addition to fully deactivating lithium-containing batteries, the methods described herein may also help to more easily recover electrode material from batteries for recycling purposes. Such delamination may be performed on electrode assemblies located in a battery cell container, and/or on scrap electrodes that have been removed from battery containers, or from a manufacturing line (e.g. defective coatings).

Following deactivation and/or electrolyte removal, active lithium remaining within the battery can be quantified using methods such as pH titration and triiodide redox titration. As described in more detail below regarding FIG. 4, pH measurements correlate well with probability of thermal runaway and excess heat generation.

For example, in the case of $CO_2$ treatment of $LiC_6$, the passivation chemical reaction may be $LiC_6 + CO_2 \rightarrow \frac{1}{2} Li_2CO_3 + Li_xC_6$. Material safety increases as x decreases.

Figure 3:
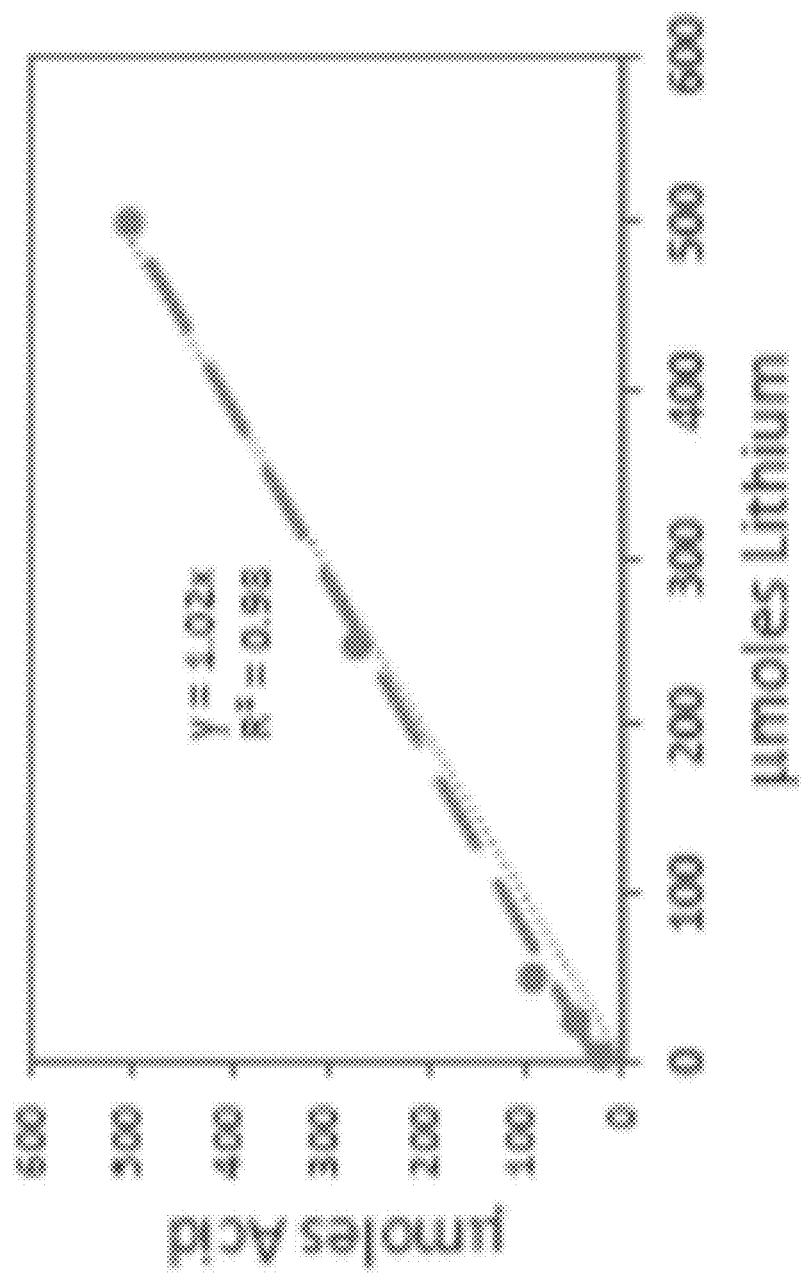
FIG. 3 shows an example of a titration relationship between an amount of LiOH and an amount of $H_2SO_4$ in accordance with an embodiment of this disclosure.

To quantify $Li_xC_6$, the $Li_xC_6$ is reacted with methanol (or water) to form x equivalents of lithium hydroxide. The lithium hydroxide is titrated using a suitable acid (e.g. $H_2SO_4$) to determine x. FIG. 3 shows an example plot of an approximately 1:1 relationship between an amount of lithium ($Li^+$) and an amount of acid equivalents ($H^+$).

Figure 4:
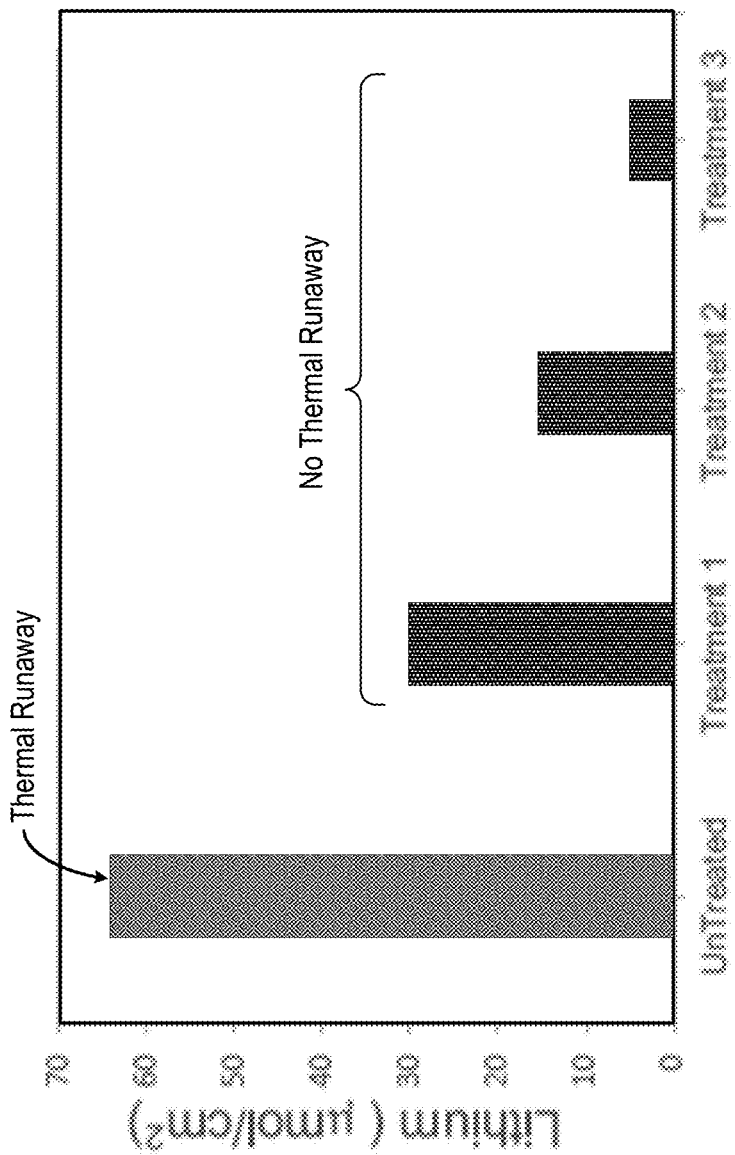
FIG. 4 shows a plot of concentrations of active lithium in an untreated lithium-containing battery, and in batteries that had undergone one, two, and three repetitions of $CO_2$ deactivation in accordance with an embodiment of this disclosure.

FIG. 4 shows a graph depicting the results of experiments that used pH titration to determine a concentration of active lithium in lithium-containing batteries. Samples were taken from an untreated lithium-containing battery at a full state of charge. Treatments 1-3 increase the dwell time at 120° C. from 0 min-4 hours. The amount of active lithium decreases with treatment time. For these cells, thermal runaway is not observed with active lithium at 20 umol/cm². Further, the untreated charged cells explode after heating, and deactivation is achieved with Treatment 2 (that is, the batteries do not explode or catch fire with heating on a 500° C. source).

In other examples, and as introduced above, the active lithium may be quantified using triiodide redox titration. For example, lithium triiodide may be formed by reacting lithium iodide with $I_2$. The reaction of $2LiC_6 + LiI_3 \rightarrow C_6 + 3LiI$ can then be used to quantify the amount of active lithium.

Figure 5:
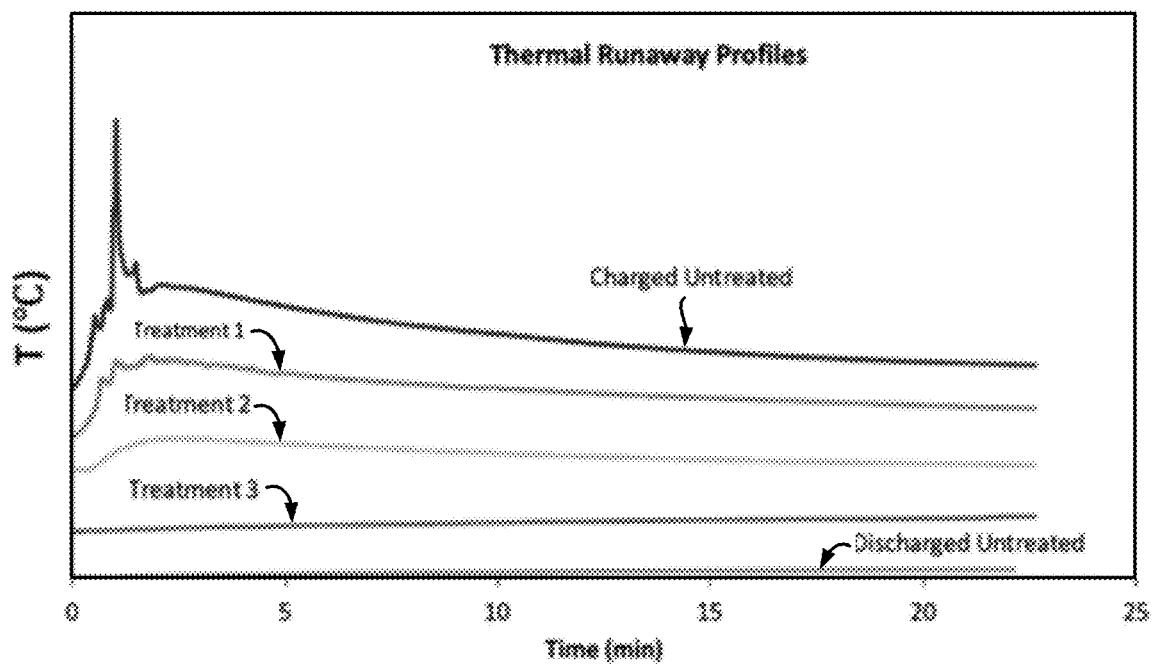
FIG. 5 shows a plot of a temperature profile of lithium containing batteries during a nail penetration test in accordance with an embodiment of this disclosure.
Figure 6:
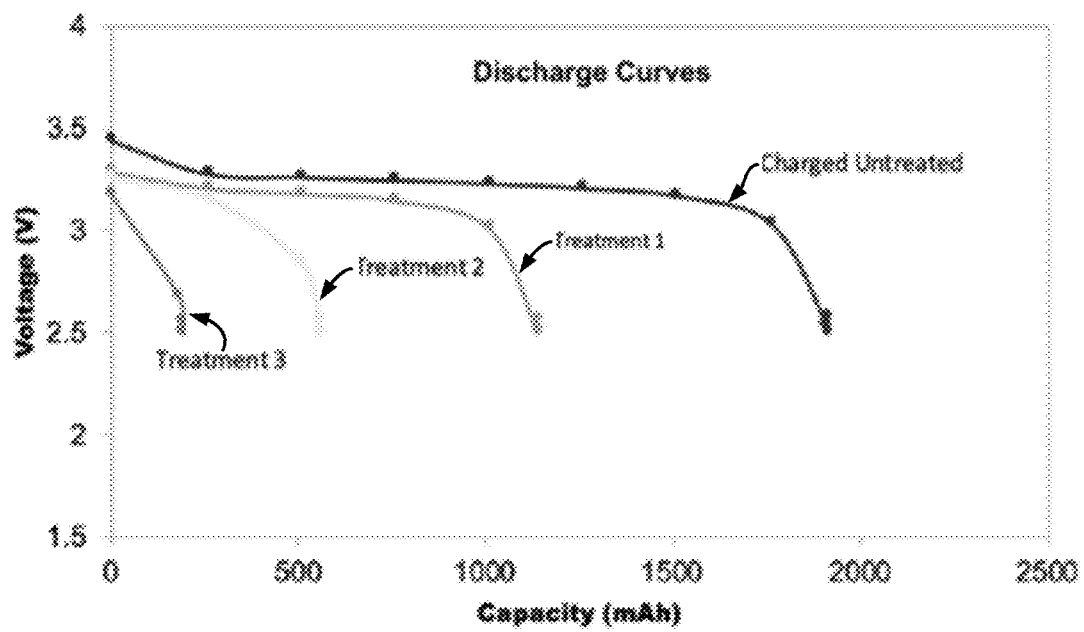
FIG. 6 shows a plot of a discharge curve of a charged and untreated lithium-containing battery and batteries that had undergone one, two, and three repetitions of $CO_2$ deactivation in accordance with an embodiment of this disclosure.

FIGS. 5 and 6 further illustrate the resistance of treated batteries to thermal runaway during a nail penetration test in which a nail was used to penetrate a battery housing. FIG. 5 shows a plot of a temperature profile of lithium containing batteries during a nail penetration test. The Treatment 1 battery was sealed into a 1 L autoclave containing 100 mL of 3% hydrogen peroxide in water, $CO_2$ was transferred to the autoclave at a pressure 900 psi, the system was heated to 120° C. in 30 min, the dwell time at 120° C. was 60 min, and the pressure was maintained at 2500 psi during the heating and dwell period. Afterwards the system heating was powered off and the autoclave cooled to room temperature in 30 min with depressurization of the $CO_2$. Treatment 2 used 120° C. for 120 min, and 2500 psi during the treatment. Treatment 3 used 100° C. for 17 hrs, and the pressure dropped off to 900 psi during the treatment. For the modified nail penetration test for each of these samples, the housing of each battery was breached at an initial time of 0 minutes, and a temperature profile of the battery is plotted relative to the temperature of the battery at the initial time. The untreated battery cell spiked in temperature up to 1000° C. within two minutes of penetration at room temperature and pressure. The treated batteries are from the same batches used in FIG. 4 above. As shown in FIG. 5, the temperature profile of treatments 2 and 3 are very similar to the temperature profile of a fully discharged untreated battery. A fully discharged cell (e.g. to short circuit) generally, will not produce heat with a nail penetration test.

FIG. 6 shows a plot of a discharge curve of a fully charged and untreated lithium-containing battery and treated batteries from the same batch used in FIGS. 4 and 5. The x-axis shows a discharged capacity of the battery (in mAh) and the y-axis shows a voltage of the battery. The capacity was measured using a battery cycler from ARBIN INSTRUMENTS, LLC of COLLEGE STATION, TEXAS under constant current conditions (e.g., 0.500 Ampere, a rate of C/4 for the cell capacity of 2 Ah), and the cell was maintained at 30° C. during discharge. As illustrated in FIG. 6, the capacity of the treated batteries decreased. The battery from treatment 3 had about 100 mAh of remaining capacity. The much lower discharge voltage than the baseline indicates high internal resistance consistent with electrolyte removal, with deactivation and passivation of carbon-lithium in the anode.

Figure 7:
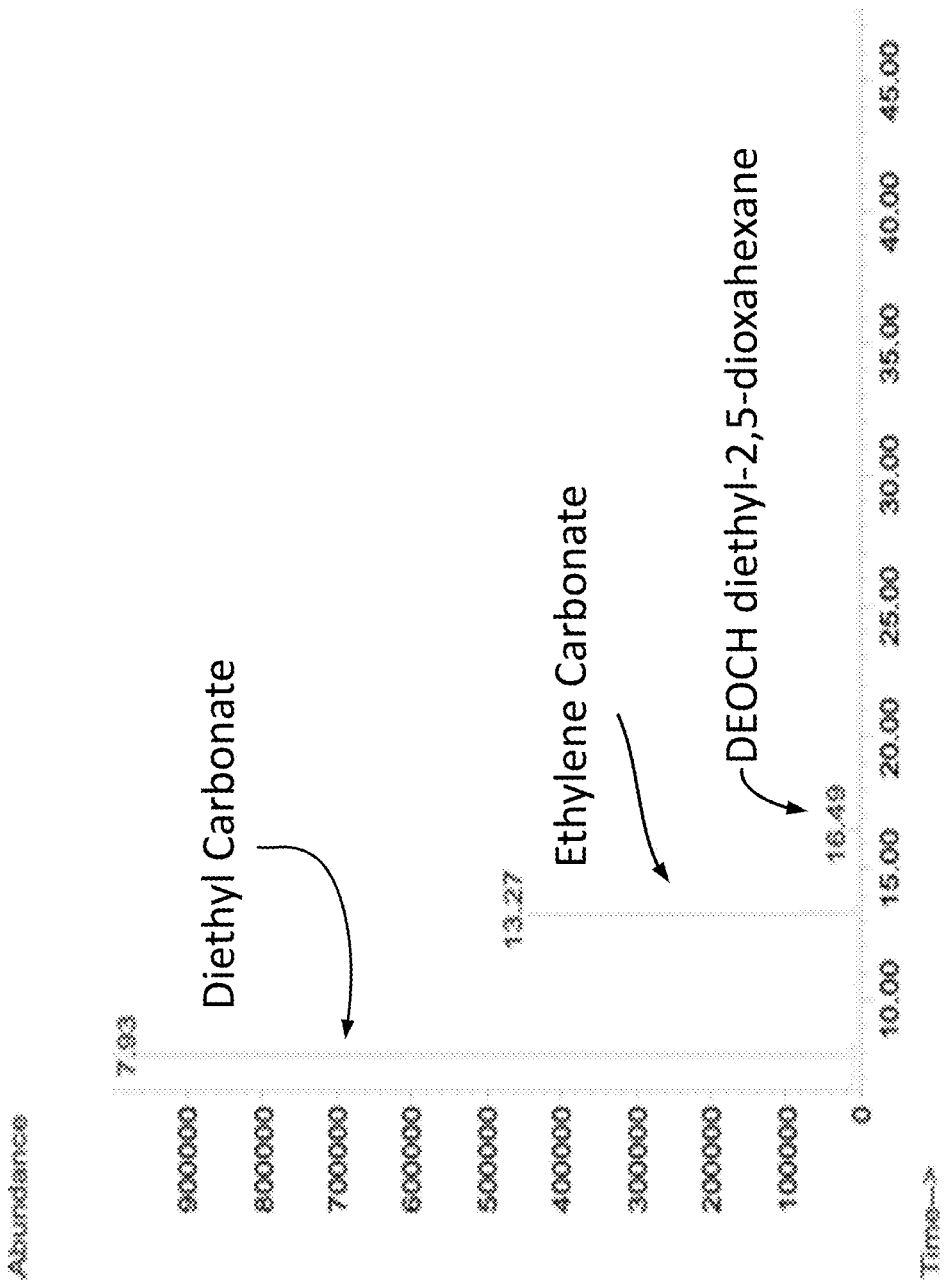
FIG. 7 shows an example chromatogram of electrolyte materials removed from a lithium-containing battery in accordance with an embodiment of this disclosure.

As introduced above, the methods described herein can be used to extract an electrolyte from a lithium-containing battery. FIG. 7 shows an example gas chromatogram of electrolyte materials removed from a lithium-containing battery. The lithium-containing battery was placed in a vessel and treated with liquid $CO_2$ without any added oxidizing fluid, the electrolyte was collected as liquid in the bottom of the vessel after the process. A sample of the liquid was analyzed via gas chromatography. As shown in FIG. 7, electrolyte materials including ethyl methyl carbonate, ethylene carbonate, diethyl-2,5-dioxahexane carboxylate (DEOHC) (a transesterification product of ethyl carbonate or diethyl carbonate) were observed.

In some examples, the electrolyte salt can react with water to produce HF, which can react with the electrolyte solvents and/or other battery materials to form ionic and non-ionic alkyl-fluorophosphates (e.g. dimethyl fluorophosphate and diethyl fluorophosphate). Advantageously, lithium carbonate formed during the processes described above with reference to FIGS. 1 and 2 can neutralize the HF. Ammonium hydroxide, pyridine, lime (mixture of calcium hydroxides and calcium oxides) or any other suitable bases can also be used to neutralize the HF.

Figure 8:
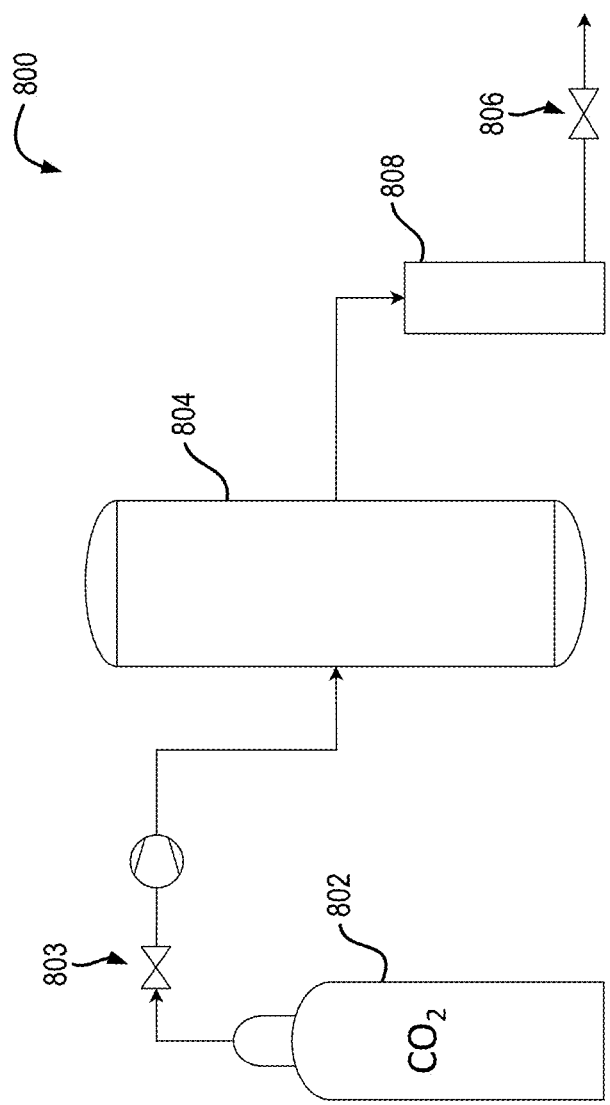
FIG. 8 shows an example of a system for extracting electrolyte from a battery in accordance with an embodiment of this disclosure.

FIG. 8 shows one example of a system 800 for extracting electrolyte from a battery. System 800 comprises a $CO_2$ source 802 configured to provide pressurized carbon dioxide to an extractor vessel 802 via control of valve 803. The $CO_2$ source may be configured to provide carbon dioxide in the form of a high pressure gas, a liquid, or a supercritical fluid in various examples. Carbon dioxide is piped into the vessel 804 to facilitate electrolyte extraction as described above. After extracting electrolyte from batteries and/or battery components in extractor vessel 804, a vacuum is drawn in the vessel 804 via control of valve 806 to remove $CO_2$ from the extraction vessel and extract the electrolyte from the battery, which is collected in electrolyte collector 808.

Lithium carbonate is an example pathway described herein for the deactivation of active lithium in/or out of a battery. It will be appreciated that the deactivated, oxidized form of lithium may include oxide, sulfide, sulfate halide, chalcogenide, chalcogenate, nitrogen-group binary salt or oxoanion of a nitrogen-group element. These end products may be single-phase, or mixed products of deactivation (e.g. lithium sulfate and lithium carbonate). The use of CO2 provides safe, low-cost, environmentally friendly industrial pathways to deactivate lithium within or outside of a battery.

Some of the process steps described and/or illustrated herein may, in some embodiments, be omitted without departing from the scope of this disclosure, and/or additional steps may be used. Likewise, the indicated sequence of the process steps may not always be required to achieve the intended results, but is provided for ease of illustration and description. One or more of the illustrated actions, functions, or operations may be performed repeatedly, depending on the particular strategy being used. It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method for deactivating a lithium-containing battery, the method comprising:
   adding the lithium-containing battery to a vessel;
   adding an amount of an oxidizing fluid to the vessel sufficient to deactivate the lithium-containing battery, wherein the oxidizing fluid comprises one or more of a fluid configured to donate protons or ozone;
   adding carbon dioxide to the vessel so as to provide a contained atmosphere comprising the oxidizing fluid and the carbon dioxide;
   pressurizing the vessel containing the contained atmosphere;
   heating the vessel to form lithium carbonate within the lithium-containing battery;
   reducing heat and pressure in the vessel; and
   removing the battery from the vessel.

2. The method of claim 1, further comprising breaching a container of the lithium-containing battery.

3. The method of claim 1, wherein the oxidizing fluid further comprises one or more of hydrogen peroxide, ammonia, oxygen, an alcohol, a halogen, $SO_2$, or a halocarbon having a boiling point below 150° C.

4. The method of claim 1, further comprising adding the oxidizing fluid mixed with the carbon dioxide.

5. The method of claim 1, wherein adding the lithium-containing battery to the vessel comprises suspending the battery above a liquid level of the oxidizing fluid.

6. The method of claim 1, wherein the oxidizing fluid is added to the vessel before the battery is added to the vessel.

7. The method of claim 1, further comprising adding the oxidizing fluid to the vessel separately from adding the carbon dioxide.

8. The method of claim 1, wherein the oxidizing fluid and the carbon dioxide are added to the vessel in a molar ratio ($CO_2$:oxidizing fluid) of between 99:1 and 10:90.

9. The method of claim 1, wherein pressurizing the vessel comprises forming a condensed carbon dioxide phase, and wherein the condensed carbon dioxide phase comprises a gas phase, a liquid phase, a supercritical phase, and/or a dense gas phase.

10. The method of claim 1, wherein pressurizing the vessel comprises pressurizing to 500-900 psi.

11. The method of claim 1, further comprising, after pressurizing the vessel, dwelling for at least 60 minutes.

12. The method of claim 1, wherein heating the vessel comprises heating to 120-130° C.

13. The method of claim 1, further comprising, after heating the vessel, dwelling for at least 60 minutes.

14. The method of claim 1, further comprising, before removing the battery from the vessel, drawing a vacuum within the vessel to remove electrolyte material from the battery.

15. A method for deactivating a lithium-containing battery, the method comprising:
   adding the lithium-containing battery to a vessel;
   adding an amount of an oxidizing fluid to the vessel sufficient to deactivate the lithium-containing battery, wherein the oxidizing fluid comprises one or more of a fluid configured to donate protons or ozone;
   adding carbon dioxide to the vessel;
   pressurizing the vessel;
   heating the vessel to form lithium carbonate, via a reaction facilitated by the oxidizing fluid and the carbon dioxide, within the lithium-containing battery;
   reducing heat and pressure in the vessel; and
   removing the battery from the vessel.

* * * * *